(12) United States Patent
Ericson

(10) Patent No.: US 6,418,902 B1
(45) Date of Patent: Jul. 16, 2002

(54) COMPOSITE FULL CIRCLE CRANKSHAFT COUNTERWEIGHT

(75) Inventor: Scott Ericson, Texarkana, TX (US)

(73) Assignee: WCI Outdoor Products, Inc., Cleveland, OH (US)

( * ) Notice: Subject to any disclaimer, the term of this patent is extended or adjusted under 35 U.S.C. 154(b) by 0 days.

(21) Appl. No.: 09/779,890

(22) Filed: Feb. 8, 2001

(51) Int. Cl.⁷ .................................................. F02B 33/04
(52) U.S. Cl. ..................................................... 123/192.2
(58) Field of Search ......................... 123/192.2, 197.4, 123/73 R, 197.3, 192.1; 74/603, 604

(56) References Cited

U.S. PATENT DOCUMENTS

| 276,910 A | 5/1883 | Skinner |
| 465,699 A | 12/1891 | Hardwick |
| 962,445 A | 6/1910 | Marble |
| 1,336,546 A | 4/1920 | Wall |
| 1,337,081 A | 4/1920 | Kuhn |
| 1,534,411 A | 4/1925 | Potter |
| 1,749,807 A | 3/1930 | Ford |
| 2,643,145 A | 6/1953 | Sundbom et al. |
| 3,748,925 A | * 7/1973 | Stewart ........................ 74/603 |
| 4,046,028 A | 9/1977 | Vachris |
| 4,319,498 A | 3/1982 | McWhorter |
| 4,342,236 A | 8/1982 | Everts |
| 4,630,498 A | 12/1986 | Santi |
| 4,708,107 A | 11/1987 | Stinebaugh |
| 4,819,593 A | 4/1989 | Bruener et al. |
| 5,265,566 A | 11/1993 | Arnold et al. |
| 5,282,397 A | 2/1994 | Harkness et al. |
| 5,295,411 A | 3/1994 | Speckhart |
| 5,435,059 A | 7/1995 | Chawla |
| 5,476,369 A | 12/1995 | Fowlkes et al. |
| 5,495,885 A | 3/1996 | Fowlkes et al. |
| 5,597,293 A | 1/1997 | Bushnell et al. |
| 5,899,120 A | 5/1999 | Leith |
| 5,931,051 A | 8/1999 | Ott |
| 6,026,776 A | * 2/2000 | Winberg .................. 123/192.1 |
| 6,062,180 A | 5/2000 | Carlback |
| 6,086,260 A | 7/2000 | Dahlberg |
| 6,135,727 A | * 10/2000 | Dreiman et al. ............ 417/415 |

* cited by examiner

Primary Examiner—Marguerite McMahon
Assistant Examiner—Hyder Ali
(74) Attorney, Agent, or Firm—Pearne & Gordon LLP

(57) ABSTRACT

A composite cranks haft counterweight of a two-cycle internal combustion engine includes a "T" shaped counterweight surrounded by a cup-shaped retainer that holds light weight inserts against the counterweight. Together with the counterweight the inserts create a full circle that reduces the empty volume in a crankcase of a two-cycle engine.

23 Claims, 3 Drawing Sheets

COMPOSITE FULL CIRCLE CRANKSHAFT COUNTERWEIGHT

FIELD OF THE INVENTION

The invention relates generally to a cranks haft counterweight for an internal combustion engine.

BACKGROUND OF THE INVENTION

A crankshaft for an internal combustion engine typically comprises a shaft having at least one eccentric crankpin. A rod connects the engine's piston to the crankpin so that linear movement of the piston is translated to rotation of the main shaft. In order to balance rotation an eccentric mass is attached to the shaft to counterbalance the mass of the crankpin, rod, and the piston. The cranks haft can either have double counterweights or be cantilevered. With a double counterweight cranks haft, force from the piston is applied at a point, or at points that distribute the force evenly between the bearings supporting the shaft. Typically, a balanced cranks haft has, for each piston, two closely spaced counterweights, joined by a crank pin to which a rod is connected. Each counterweight is attached to a shaft. A cantilevered cranks haft has only one counterweight and shaft.

For two-cycle engines, it is common to use a "T" shaped counterweight. A crank pin is attached near the bottom of the stem of "T". One shaft (in the case of a cantilevered cranks haft) or two shafts (in the case of a balanced cranks haft) are attached to the counterweight(s) at its dimensional center. A "T" shaped counterweight is not strictly or literally in the form of a "T". Rather, the "T" description suggests a relative distribution of mass to a side opposite of the crank pin and perpendicular to its axis of rotation. Shapes that are closer to that of a triangle or a triangle with two squeezed sides are also considered "T" shaped counterweights. "T" shaped counterweights are typically made from a single piece of metal, but have also been constructed using "laminations" or a multiple, stacked plates cut in a "T" shape and joined by, for example, pins. Examples of these types of counterweights are shown in U.S. Pat. No. 4,342,236. Most of the mass of a "T" shaped counterweight is concentrated where it is most effective, while reducing the overall mass of the counterweight.

To transfer a charge of a fuel and air mixture from a carburetor into a cylinder, a process referred to as scavenging, two-cycle engines typically draw into the engine's crankcase the charge using a pressure decrease generated by upstroke of the piston. The down stroke of the piston then compresses, and thereby pressurizes, the charge prior to an intake port opening on the cylinder. The relatively higher pressure of the charge causes it to flow into the relative lower pressure cylinder. Increasing the pressure differential enhances scavenging of the cylinder. Better scavenging tends to improve engine performance and reduce emissions. Because the volume that the piston displaces during movement is fixed, decreasing the volume of voids within the crankcase will tend to increase pressure within the crankcase and thus improve scavenging.

Some of the volume of the voids within the crankcase is necessary to accommodate the sweep of the counterweight. Because the swept volume of the counterweight in particular "T" shaped counterweights is significantly greater than the actual volume of the counterweight, it is desirable to fill this void. One prior art approach is to extend the shape of the counterweight to form a full circle. Most of circle is relatively thin, but it includes a much thicker, "T"-shaped portion forming the counterweight and support for attaching a crank pin and cranks haft. A drawn metal cup having a circular shape is attached to the edges of the extended counterweight to enclose voids on either side of the thick "T" shape and the extended edge.

This example of a "full circle" counterweight has several problems. First, the counterweight is made of forged steel in order to make it into a circular shape with most of its mass concentrated in the thick "T"-shaped area. Forging the counterweight is a relatively expensive process. Second, because the steel extends to the edges of the circle, the overall mass of the counterweight is increased. Further, the mass is added in places where it is not useful for counterbalance. Not only is the additional weight an extra load on the engine, it is also detrimental to balance of the cranks haft.

Another example, useful for laminate-constructed counterweights, is to cut openings in each of the inner layers of the laminate to form in each layer a "T" shape surrounded by a circle, and attach complete, circular shaped layers on the outside to seal the voids created by the openings in the inner layers on the outer layers, thus creating sealed voids. However, manufacture and assembly of this type of full circle counterweight is relatively complicated, and extra mass is added in places where it is not useful for counterbalance.

SUMMARY OF THE INVENTION

The invention relates to an improved full circle counterweight for a cranks haft of an internal combustion engine that overcomes one or more of the problems with prior art.

The invention, as defined by the claims, is disclosed below as part of a detailed description of an example of two-cycle engine for a power tool having a full-circle counterweight assembly.

The full circle counterweight assembly in the disclosed example includes a counterweight that is shaped generally like that of a conventional "T"-shaped counterweight. Like a conventional "T" shaped counterweight, it includes openings for receiving a crank pin and a shaft. The T-shaped metal counterweight is partially encased within a retainer in the form of a drawn metal cup. Two lightweight spacers, made for example from plastic, fill voids on opposite sides of the stem of the "T" shaped counterweight. Edges of the cup are folded over to retain the inserts within the cup, and to retain the cup on the metal counterweight. As compared to the prior art, little additional weight is added to make the counterweight full circle. Further, as compared to prior art, the full circle counterweight assembly tends to be more easily and less expensively made. The metal counterweight, cup and lightweight inserts can be assembled according to standard, relatively low cost methods. The assembly is relatively simple, as it involves relatively few parts and steps. The full circle counterweight finds particular advantage in two-cycle engines of the type used in power tools and equipment, as such engines must be both lightweight and easily manufactured to reduce cost, while meeting increasingly stringent emission requirements.

DETAILED DESCRIPTION

Figure 1:
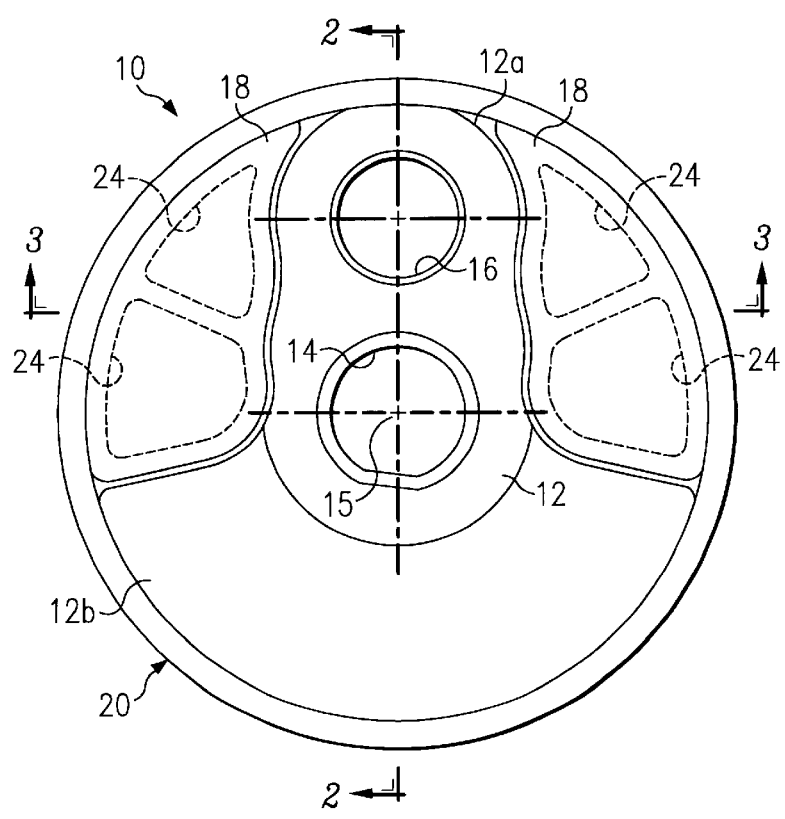
FIG. 1 is a view of a full circle counterweight assembly.

In the following detailed description of an example of an embodiment of the invention, like reference characters refer to like parts.

Figure 2:
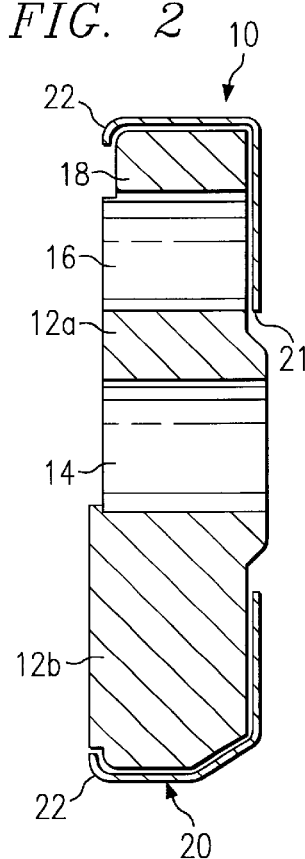
FIG. 2 is a cross-section of the full circle counterweight assembly of FIG. 1, taken along section line 2—2.
Figure 3:
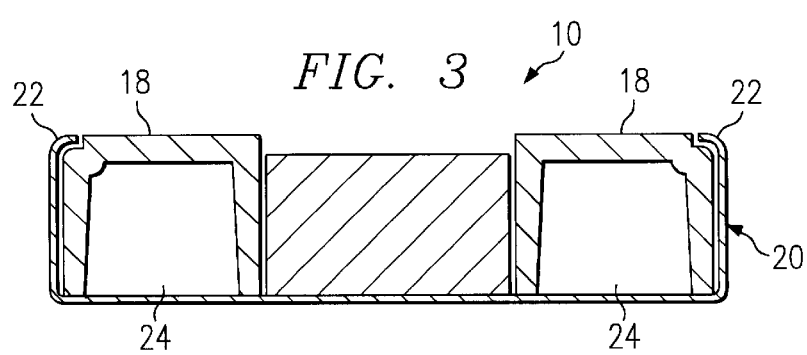
FIG. 3 is a cross-section of the full circle counterweight assembly of FIG. 1 taken along section line 3—3.

Referring to FIGS. 1, 2 and 3, full circle counterweight assembly 10 includes a "T" shaped counterweight, which is generally designated 12, and a retainer in the form of drawn metal cup 20 that holds inserts 18 next to the stem of the T-shaped counterweight. The "T"-shaped counterweight includes a stem portion 12a in which is formed openings 14 and 16 for a shaft and crankpin, respectively, and a cross portion 12b, which contains most of the mass of the counterweight and is disposed on the side of the dimensional center of the counterweight opposite opening 16. As can be seen from the drawings, cross-portion 12b has a semi-circular or curved outer diameter that fits the curvature of retainer cup 20. Ends of either one or two shafts (not shown) are fitted into opening 14 in a conventional manner. Axis 15 is the center of the retainer cup 20, shaft(s), and the axis of rotation of the counterweight assembly 10. A crank pin (not shown) is fitted into opening 16 in a conventional manner. Conventional methods, including relatively low-cost methods, may be used to fabricate the counterweight of metal. The counterweight could be, if desired, of laminate construction.

Inserts 18 are, as compared to the metal counterweights, made of a much less dense material, and thus relatively lightweight. They may be made, for example, from a plastic such as nylon or other material that has a sufficiently high melting point to resist melting in the engine, tends not to degrade in the presence of the fuel and oil within an engine's crankcase, and that is of density substantially less than of the metal used to form the counterweightSuitable materials with lower density than the counterweight for inserts 18 include materials such as plastic, aluminum, and magnesium, composite materials, and materials with closed cells, such as honeycombs, foam, or closed cell plastic.

Cup 20 may be made from a thin durable metal such as steel. The diameter of the retainer cup is approximately the diameter path of the rotating counterweight. To hold the inserts 18 within the retainer cup, and to hold the retainer cup on the counterweight 12, the edge of the retainer cup 20 is bent over edges of the counterweight 12 and inserts 18. During assembly cranks haft opening 14 is aligned with a corresponding opening 21 in the retainer cup's back wall 20. Depending on the size of the opening, the retainer may take on a form closer to that of a ring. Inserts 18 are then placed into the open regions in retainer cup 20 so that an insert 18 is placed on each flank of the stem of the "T" shaped counterweight 12.

After the inserts are fitted, an extended edge of retainer cup 20 is bent inward towards the center of retainer cup 20 and down over counterweight 12 and inserts 18 to form a retaining edge or lip 22. The length of retaining edge 22 need only be of sufficient length to retain inserts 18 firmly in position, and to keep the retainer firmly attached to the counterweight 12. Outer edges of inserts 18 and counterweight 12 may be notched to a depth of the thickness of the lip 22 to receive the lip, thus reducing the profile of the counterweight assembly allowing clearance of the void within the crankcase required for the counterweight to be reduced. To further reduce weight, inserts 18 may be cored to remove mass, by milling for example, to create voids 24. These voids face inwardly, toward the retainer cup and sit against the cup's back wall.

Figure 4:
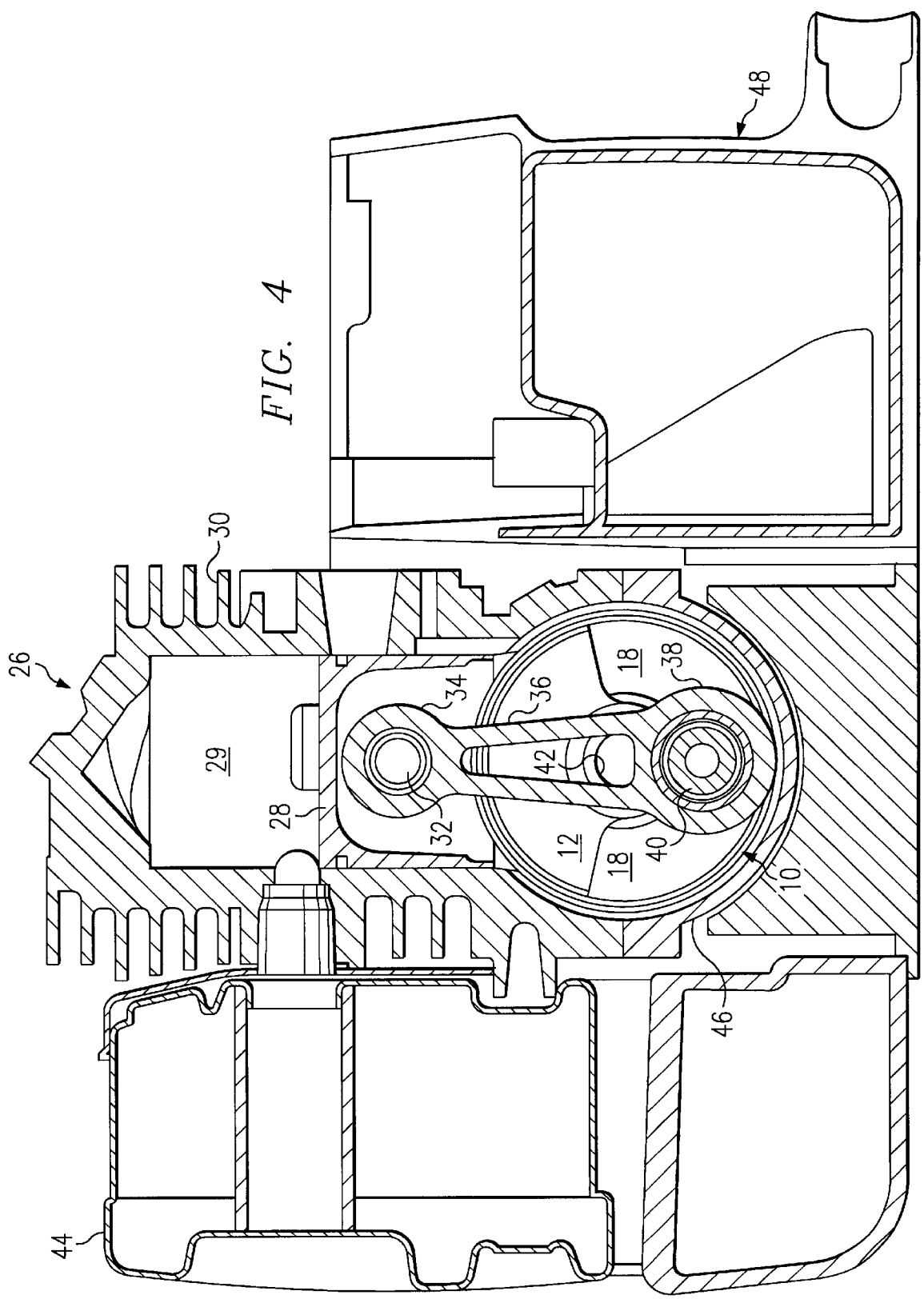
FIG. 4 is a cross-section of an engine including the full circle counterweight of FIG. 1.
Figure 5:
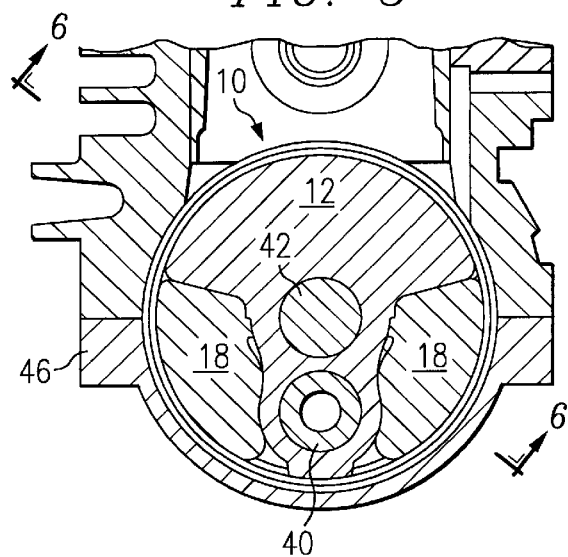
FIG. 5 is a partial cross-section of the engine of FIG. 4, taken through the full circle counterweight and crankcase.
Figure 6:
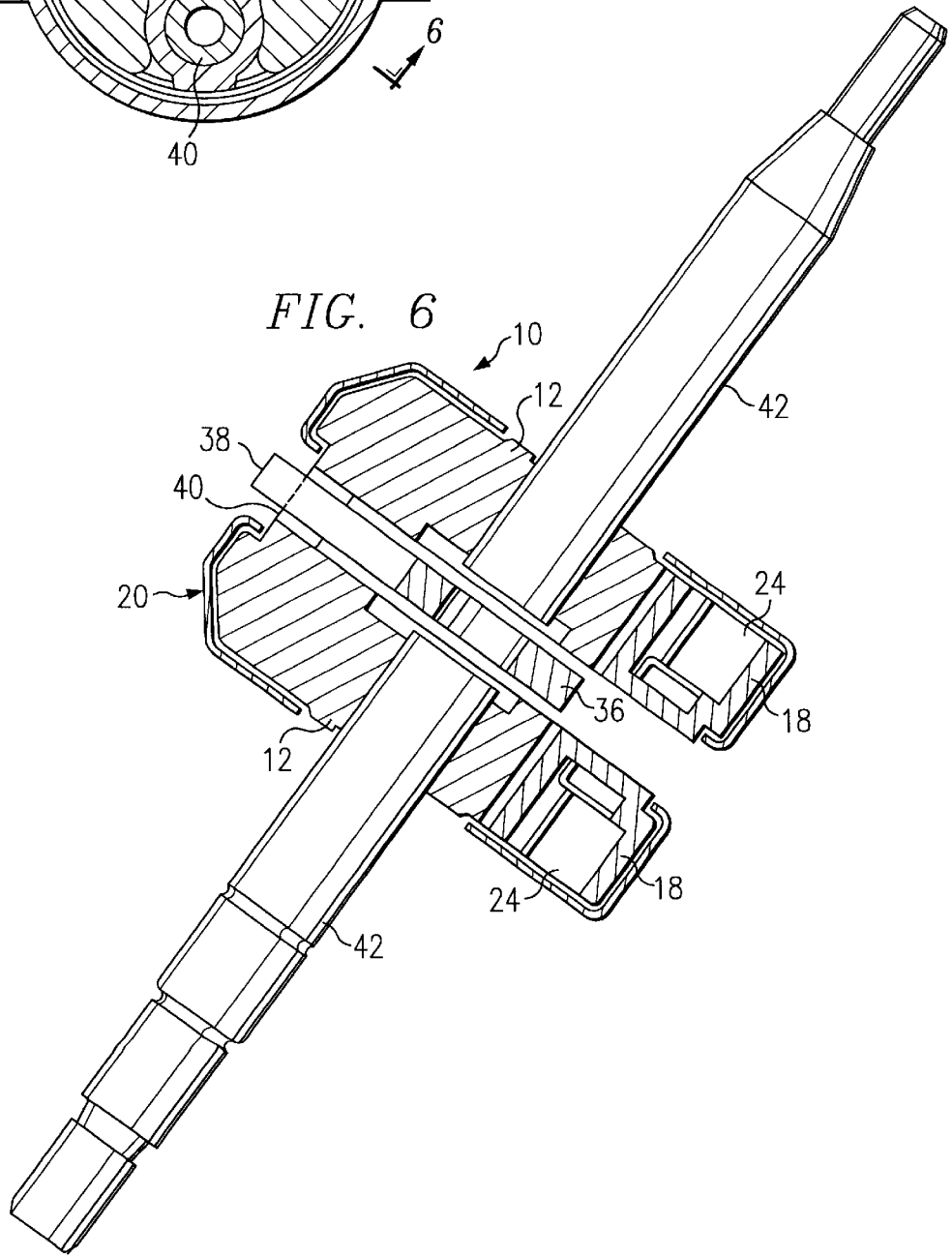
FIG. 6 is a partial cross-section of the cranks haft of the engine partially shown in FIG. 5, taken along section line 6—6.

Referring to FIGS. 4, 5 and 6 two-cycle engine 26 is an example of one use of counterweight assembly 10. The engine includes a piston 28 mounted for reciprocating movement within a cylinder 29 formed in cylinder block 30. The piston includes a wrist pin 32 for connecting it to an eyelet 34 of rod 36. On an opposite end of rod 36 is a second eyelet 38 for connecting to crankpin 40. The crank pin is connected to counterweight assembly 10. Connected to the counterweight assembly is shaft 42. Also shown is a muffler 44 for receiving exhaust from cylinder 29. Shaft 42 transmits power through a transmission system to a working element that is not shown. The shaft and full circle counterweight assembly is mounted within crankcase 46. As shown in FIG. 6, the cranks haft with illustrated engine 26 has two full circle counterweight assemblies 10 and two shafts 42 joined back-to-back to form a balanced cranks haft. In the particular example in FIG. 4, the engine is mounted to a chassis 48 of a chain saw of known construction. A saw, not shown, depends from one side of the engine and chassis, as does a pair of handles. No particular configuration of engine or tool is intended to be implied by the example. For example, the counterweight assembly 10 may be used with either cantilevered or balanced crankshafts. Other examples of tools are vegetation trimmers, brushcutters, hedge trimmers, lawn mowers, edgers, and leaf blowers, for which it is advantageous to use two-stroke engines for weight and cost considerations.

Lightweight inserts 18 fill what would otherwise be void within the crankcase 46. Crankcase is preferably constructed to provide only the clearance necessary for the various moving parts. The inserts thus reduce the volume within the crankcase that would otherwise be necessary for clearance. A full circle counterweight with light weight inserts and a retainer holding them to a T-shaped counterweight thus contributes to increased power and lower exhaust emissions through improved crankcase compression in crank case scavenged engines, while maintaining good rotational balance for a cranks haft and good manufactureability.

Having described a detailed, representative embodiment of the invention, what is claimed is:

1. A counterweight assembly including:
   a counterweight having a non-circular shape; one or more inserts disposed adjacent to the counterweight to create a circular outline; and
   a cup-shaped, circular retainer positioned about the counterweight and the one or more inserts for holding the one or more inserts relative to the counterweight, the retainer having an open side for receiving the counterweight and the one or more inserts, and a retaining edge at the open side overlaying at least a portion of the one or more inserts for retaining the one or more inserts within the retainer.

2. A counterweight assembly as set forth in claim 1, wherein the one or more inserts have one or more voids, at least one void opens toward a side of the retainer that is opposite to the open side of the retainer.

3. A counterweight assembly as set forth in claim 2, wherein the one or more inserts only engage the side of the retainer opposite to the open side at edges bounding the at least one void opening.

4. A counterweight assembly as set forth in claim 2, wherein the one or more inserts have solid surfaces at the open side of the retainer.

5. A counterweight assembly as set forth in claim 1, wherein the one or more inserts have a peripheral notch for receiving the overlaying retaining edge.

6. A counterweight assembly as set forth in claim 1, wherein the one or more inserts are preformed to fit in mating relationship with the counterweight for disposition adjacent to the counterweight and retention by the retainer.

7. A counterweight assembly as set forth in claim 6, wherein the counterweight is T-shaped, the one or more inserts include two inserts, each insert is preformed and placed to mate with a respective side of the T-shape of the counterweight.

8. A counterweight assembly as set forth in claim 1, wherein the retaining edge overlays at least a portion of the counterweight.

9. A counterweight assembly as set forth in claim 8, wherein the counterweight has a peripheral notch for receiving the overlaying retaining edge.

10. A counterweight assembly as set forth in claim 1, wherein the retaining edge extends along the entire circular extent of the retainer.

11. A counterweight assembly including:
a counterweight having a non-circular shape;
one or more inserts disposed adjacent to the counterweight to create a circular outline; and
a cup-shaped, circular retainer as a separate member positioned about the counterweight and the one or more inserts and entrapping the one or more inserts and the counterweight within the retainer with an overlaying edge at one side of the retainer.

12. A cranks haft with a counterweight assembly, including:
a crankshaft; and
a counterweight assembly affixed to the crankshaft, wherein the counterweight assembly includes:
a counterweight having a non-circular shape;
one or more inserts disposed adjacent to the counterweight to create a circular outline; and
a cup-shaped, circular retainer positioned about the counterweight and the one or more inserts for holding the one or more inserts relative to the counterweight, the retainer having an open side for receiving the counterweight and the one or more inserts, and a retaining edge at the open side overlaying at least a portion of the one or more inserts for retaining the one or more inserts within the retainer.

13. A crankshaft with a counterweight assembly as set forth in claim 12, wherein the one or more inserts have one or more voids, at least one void opens toward a side of the retainer that is opposite to the open side of the retainer.

14. A crankshaft with a counterweight assembly as set forth in claim 13, wherein the one or more inserts only engage the side of the retainer opposite to the open side at edges bounding the at least one void opening.

15. A crankshaft with a counterweight assembly as set forth in claim 12, wherein the one or more inserts have a peripheral notch for receiving the overlaying retaining edge.

16. A crankshaft with a counterweight assembly as set forth in claim 12, wherein the one or more inserts are preformed to fit in mating relationship with the counterweight for disposition adjacent to the counterweight and retention by the retainer.

17. A crankshaft with a counterweight assembly as set forth in claim 12, wherein the retaining edge overlays at least a portion of the counterweight and the counterweight has a peripheral notch for receiving the overlaying retaining edge.

18. An engine including:
a piston for reciprocation within a cylinder;
a crankshaft disposed within a crankcase and connected to the piston; and
a counterweight assembly affixed to the crankshaft, wherein the counterweight assembly includes:
a counterweight having a non-circular shape;
one or more inserts disposed adjacent to the counterweight to create a circular outline; and
a cup-shaped, circular retainer positioned about the counterweight and the one or more inserts for holding the one or more inserts relative to the counterweight, the retainer having an open side for receiving the counterweight and the one or more inserts, and a retaining edge at the open side overlaying at least a portion of the one or more inserts for retaining the one or more inserts within the retainer.

19. An engine as set forth in claim 18, wherein the one or more inserts have one or more voids, at least one void opens toward a side of the retainer that is opposite to the open side of the retainer.

20. An engine as set forth in claim 19, wherein the one or more inserts only engage the side of the retainer opposite to the open side at edges bounding the at least one void opening.

21. An engine as set forth in claim 18, wherein the one or more inserts have a peripheral notch for receiving the overlaying retaining edge.

22. An engine as set forth in claim 18, wherein the one or more inserts are preformed to fit in mating relationship with the counterweight for disposition adjacent to the counterweight and retention by the retainer.

23. An engine as set forth in claim 18, wherein the counterweight assembly provides for a balanced crankshaft.

* * * * *

UNITED STATES PATENT AND TRADEMARK OFFICE
CERTIFICATE OF CORRECTION

PATENT NO. : 6,418,902 B1
DATED : July 16, 2002
INVENTOR(S) : Ericson

It is certified that error appears in the above-identified patent and that said Letters Patent is hereby corrected as shown below:

<u>Title page,</u>
Item [57], ABSTRACT,
Line 1, please delete "cranks haft" and insert therefor -- crank shaft --.

<u>Column 1,</u>
Lines 5, 16, 18, 21, 24, 28 and 29, please delete "cranks haft" and insert therefor
-- crankshaft --.

<u>Column 2,</u>
Lines 2, 15 and 21, please delete "cranks haft" and insert therefor -- crankshaft --.
Line 54, please delete "," after simple.

<u>Column 3,</u>
Line 5, FIG. 6, please delete "cranks haft" and insert therefor -- crankshaft --.
Line 42, please insert -- . --.
Line 53, please delete "cranks haft" and insert therefor -- crankshaft --.

<u>Column 4,</u>
Lines 21, 23 and 45, please delete "cranks haft" and insert therefor -- crankshaft --.

<u>Column 5,</u>
Line 34, please delete "cranks haft" and insert therefor -- crankshaft --.

Signed and Sealed this

Twenty-sixth Day of November, 2002

Attest:

JAMES E. ROGAN
*Attesting Officer*           *Director of the United States Patent and Trademark Office*